United States Patent
Palfai

(10) Patent No.: US 9,772,030 B2
(45) Date of Patent: Sep. 26, 2017

(54) SPLIT GEAR ASSEMBLY WITH ONE-WAY ROLLER CLUTCH FOR CONTROLLING BACKLASH IN OPPOSED-PISTON ENGINES

(71) Applicant: Achates Power, Inc., San Diego, CA (US)

(72) Inventor: Balazs V. Palfai, San Marcos, CA (US)

(73) Assignee: ACHATES POWER, INC., San Diego, CA (US)

( * ) Notice: Subject to any disclaimer, the term of this patent is extended or adjusted under 35 U.S.C. 154(b) by 285 days.

(21) Appl. No.: 14/450,747

(22) Filed: Aug. 4, 2014

(65) Prior Publication Data

US 2016/0033030 A1 Feb. 4, 2016

(51) Int. Cl.
- *F16H 55/18* (2006.01)
- *F16H 57/12* (2006.01)
- *F02B 75/28* (2006.01)

(52) U.S. Cl.
CPC ............ *F16H 57/12* (2013.01); *F02B 75/28* (2013.01); *F16H 55/18* (2013.01); *F16H 2057/127* (2013.01)

(58) Field of Classification Search
CPC ........ F02B 75/28; F02B 75/282; F16H 55/18; F16H 55/08; F16H 1/22; F16H 2055/185
See application file for complete search history.

(56) References Cited

U.S. PATENT DOCUMENTS

| | | | |
|---|---|---|---|
| 2,607,238 A | 4/1951 | English et al. | |
| 3,174,356 A | 3/1965 | Michalec | |
| 3,359,819 A * | 12/1967 | Veillette | F16H 55/18 464/68.1 |
| 4,739,670 A * | 4/1988 | Tomita | F16H 55/18 74/409 |
| 4,747,321 A | 5/1988 | Hannel | |
| 4,805,475 A | 2/1989 | Hannel | |
| 4,881,422 A | 11/1989 | Maguire | |
| 4,947,707 A * | 8/1990 | Koenneker | F16H 55/18 464/68.1 |

(Continued)

FOREIGN PATENT DOCUMENTS

| | | | |
|---|---|---|---|
| BE | WO 2008142131 A2 * | 11/2008 | F16H 55/18 |
| GB | 593183 A * | 10/1947 | F16H 55/18 |

(Continued)

OTHER PUBLICATIONS

International Search Report and Written Opinion for PCT application PCT/US2015/043106, mailed Jan. 20, 2016.

*Primary Examiner* — Zakaria Elahmadi
(74) *Attorney, Agent, or Firm* — Terrance A. Meador; Julie J. Muyco

(57) ABSTRACT

Backlash is controlled in an opposed-piston engine that includes two crankshafts disposed in a parallel, spaced-apart relationship and a gear train coupling the first and second crankshafts, the gear train including a driving gear coupled to the first crankshaft and a split gear assembly engaged with the driving gear to transfer rotation from the driving gear to the split gear assembly. The split gear assembly includes first and second gears, a spring mechanism that acts to angularly offset the first gear relative to the second gear in a first direction, and a one-way clutch mechanism that prevents relative angular movement of the first gear relative to the second gear in a second direction opposite the first direction.

9 Claims, 6 Drawing Sheets

(56) References Cited

U.S. PATENT DOCUMENTS

| | | | | |
|---|---|---|---|---|
| 5,870,928 | A * | 2/1999 | Genter | F16H 55/18 74/409 |
| 5,934,144 | A * | 8/1999 | Marinkovic | F16H 55/18 74/411 |
| 5,979,260 | A * | 11/1999 | Long | F16H 55/18 464/62.1 |
| 6,148,684 | A * | 11/2000 | Gardiner | B41F 13/012 101/216 |
| 6,293,166 | B1 * | 9/2001 | Genter | F16H 55/18 74/397 |
| 7,377,194 | B2 * | 5/2008 | Shimizu | B62D 5/0409 74/388 PS |
| 7,475,763 | B2 | 1/2009 | Jegatheeson | |
| 8,943,914 | B2 * | 2/2015 | Steele | F02N 15/022 123/185.1 |
| 9,121,494 | B2 * | 9/2015 | Buchleitner | F16H 55/18 |
| 2004/0089089 | A1 | 5/2004 | Stevens et al. | |
| 2010/0304907 | A1 | 12/2010 | Yuan | |
| 2010/0311529 | A1 * | 12/2010 | Ochab | F16D 43/18 474/11 |
| 2011/0030489 | A1 | 2/2011 | Chen et al. | |
| 2012/0125729 | A1 | 5/2012 | Jimbo | |
| 2012/0129645 | A1 | 5/2012 | Palfai et al. | |
| 2012/0129647 | A1 | 5/2012 | Palfai et al. | |
| 2012/0285422 | A1 | 11/2012 | Exner et al. | |
| 2013/0213168 | A1 * | 8/2013 | Buchleitner | F16H 55/18 74/445 |
| 2014/0116174 | A1 * | 5/2014 | Sandner | F16H 55/18 74/440 |
| 2014/0224053 | A1 * | 8/2014 | Buchleitner | F16H 55/17 74/445 |
| 2014/0299109 | A1 | 10/2014 | Fuqua et al. | 123/51 R |
| 2015/0020627 | A1 | 1/2015 | Palfai et al. | 74/421 R |
| 2015/0020629 | A1 | 1/2015 | Koszewnik et al. | 74/445 |
| 2015/0180304 | A1 * | 6/2015 | Miller | F16H 1/28 475/149 |

FOREIGN PATENT DOCUMENTS

| | | |
|---|---|---|
| JP | S58-094673 A | 6/1983 |
| JP | H02-078852 U | 6/1990 |
| JP | H07-229551 A | 8/1995 |
| WO | WO-2014/168842 A1 | 10/2014 |

* cited by examiner

SPLIT GEAR ASSEMBLY WITH ONE-WAY ROLLER CLUTCH FOR CONTROLLING BACKLASH IN OPPOSED-PISTON ENGINES

RELATED APPLICATIONS

This application contains subject matter related to the subject matter of commonly-owned U.S. application Ser. No. 13/944,787, "Gear Noise Reduction In Opposed-Piston Engines," published as US 2015/0020627 and commonly-owned U.S. application Ser. No. 14/074,618, "Gear Noise Reduction In Opposed-Piston Engines", published as US 2015/0020629, which is a continuation-in-part of U.S. application Ser. No. 13/944,787.

BACKGROUND

The field is reduction of noise, vibration, and harshness (NVH) in an opposed-piston engine. More specifically, the field covers controlling backlash in the gear train of an opposed-piston engine with a split gear construction.

Gear vibration and clash in an internal combustion engine of a vehicle lead to intense whining and/or sharp impulse noise which can cause operator and passenger discomfort. Engine whine and rattle also add to the constant cacophony that makes proximity to transportation routes and industrial sites very unpleasant. Consequently, performance standards and environmental regulations relating to engines increasingly include NVH limits.

When gears interface with each other, there are usually gaps between the interfacing gear teeth. As the gears rotate, these gaps are closed when the teeth move to make contact, which can result in gear rattle. In some instances, the space is called backlash; in other instances the movement made to close the gaps is called backlash. In either case, it is desirable to control, reduce, or eliminate backlash.

The gear train of an opposed-piston engine with dual crankshafts inherently experiences torque reversals. In the case where a phase difference is provided between the crankshafts in order to differentiate port opening and closing times, the gear train is subjected to multiple torque reversals during every cycle of engine operation. With backlash, the engine's operation is afflicted with audible clatter and hammering as instantaneous accelerations caused by the reversals cascade through the gear train. Even without an inter-crankshaft phase difference, momentary inter-gear torque reversals result from idler bounce and/or gear/shaft rotational distortion.

The well-known split gear construction provides an underpinning for various solutions to gear train backlash. In a split gear construction, two or more gears are arranged in an abutting, face-to-face relationship on a common shaft or post so as to act as a single gear. Various means are employed to impose and maintain a rotational offset between the gears by a distance amounting to some fraction of a gear tooth. The relative movement effectively increases the width of the split gear's teeth, thereby closing interstitial space between meshed gear teeth. Some of these split gear constructions use bias members such as springs that continuously act between the gears so as to maintain a rotational offset that varies in response to rotation of the gear and to sporadic accelerations caused by torque reversals, etc. The rotational offset automatically moves the gears to maintain closure of the gaps between meshed gear teeth. See, for example, U.S. Pat. No. 2,607,238 and U.S. Pat. No. 3,174,356. Because the resulting back-and-forth movements of the split gear teeth resemble the opening and closing actions of scissor blades, these gears may also be called "scissor gears". In this regard, see US publication 20110030489.

In related U.S. application Ser. Nos. 13/944,787 (Pre-Grant Publication US 2015/0020627) and 14/074,618 (Pre-Grant Publication US 2015/0020629) split gear constructions include combinations of compliant and stiff gears. The compliant gears receive the torque load first and slightly deform as the stiff gears begin to absorb the gear loads. As a compliant gear deforms, a stiff gear increasingly absorbs torque loads, which are transmitted via friction between compliant and stiff gears. Consequently, only a compliant gear transfers the total torque load to a hub thereby reducing or eliminating gear backlash.

The spring-biased split gear constructions are intended to automatically eliminate backlash by relative rotation between the two gears in opposing directions. Thus, as a succession of torque reversals occurs, slack is taken up by a succession of rotational adjustments of the split gears. This results in a continuous back-and-forth movement of the gears that causes wear of the gear parts and consumes energy. The split gear constructions of the related applications depend on the availability of compliant materials which may be in short supply, or, if available, unsuited to particular applications. Therefore, it is desirable to have spring-biased gear constructions with anti-backlash capability available that reduce wear, conserve energy, and operate well in a broad range of applications.

According to this disclosure the technological problem of backlash in the gear train of an opposed-piston engine is solved with a split gear construction that achieves wear reduction, energy conservation, and good operation in a broad range of applications. In this construction, relative rotation between two gears of a split gear assembly is allowed in a first direction, but constrained in the second direction. A first gear of the split gear is automatically rotated with respect to the second gear in the first direction until it contacts one flank of a tooth groove in a mating gear. At this point the second gear is in contact with the opposite flank of the tooth groove and backlash is reduced, if not eliminated, as the split gear rotates. When torque reversal occurs, the counter-rotation constraint keeps the two gears locked in their previously-rotated positions and no backlash is available.

SUMMARY

A split gear assembly includes first and second gears, a spring mechanism that acts to rotate the first gear relative to the second gear in a first direction, and a one-way clutch mechanism that prevents rotation of the first gear relative to the second gear in a second direction opposite the first direction.

A gear train assembly coupling two crankshafts of an opposed-piston engine that are disposed in a parallel, spaced-apart relationship includes a driving gear coupled to a first crankshaft and a split gear assembly engaged with the driving gear to transfer rotation from the driving gear to the split gear assembly. The split gear assembly includes first and second gears, a spring mechanism that acts to rotate the first gear relative to the second gear in a first direction, and a one-way clutch mechanism that prevents rotation of the first gear relative to the second gear in a second direction opposite the first direction.

Backlash is controlled in an opposed-piston engine that includes two crankshafts disposed in a parallel, spaced-apart relationship and a gear train coupling the first and second crankshafts. The gear train includes a driving gear coupled to the first crankshaft and a split gear assembly engaged with the driving gear to transfer rotation from the driving gear to the split gear assembly. A method of controlling the backlash includes driving rotation of the first and second crankshafts, angularly offsetting a first gear of the split gear assembly relative to a second gear in a first direction, and preventing relative angular movement of the first gear relative to the second gear in a second direction opposite the first direction.

DETAILED DESCRIPTION

Figure 1:
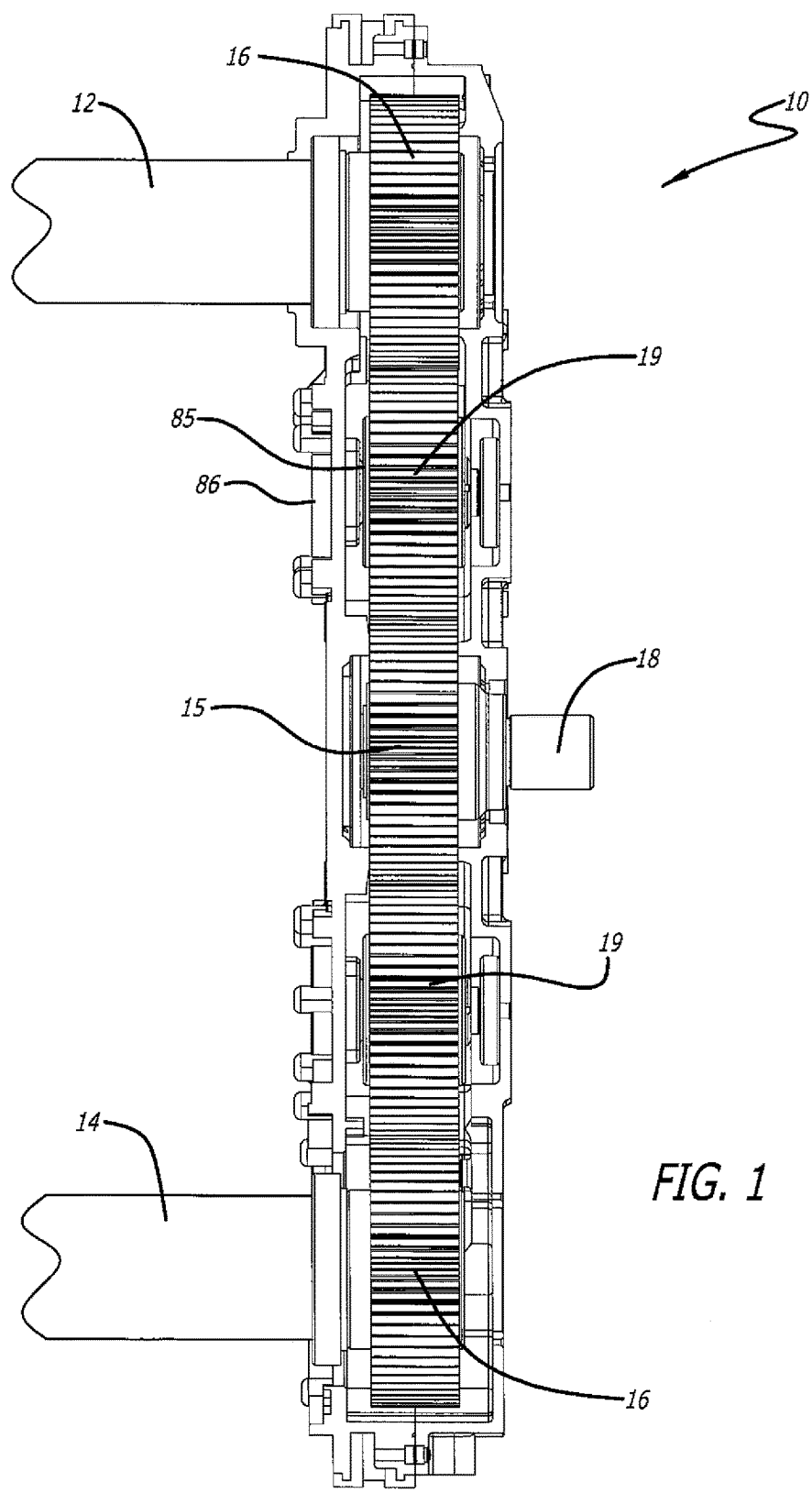
FIG. 1 is a side view of a gear train in an opposed-piston engine equipped with two crankshafts.
Figure 2:
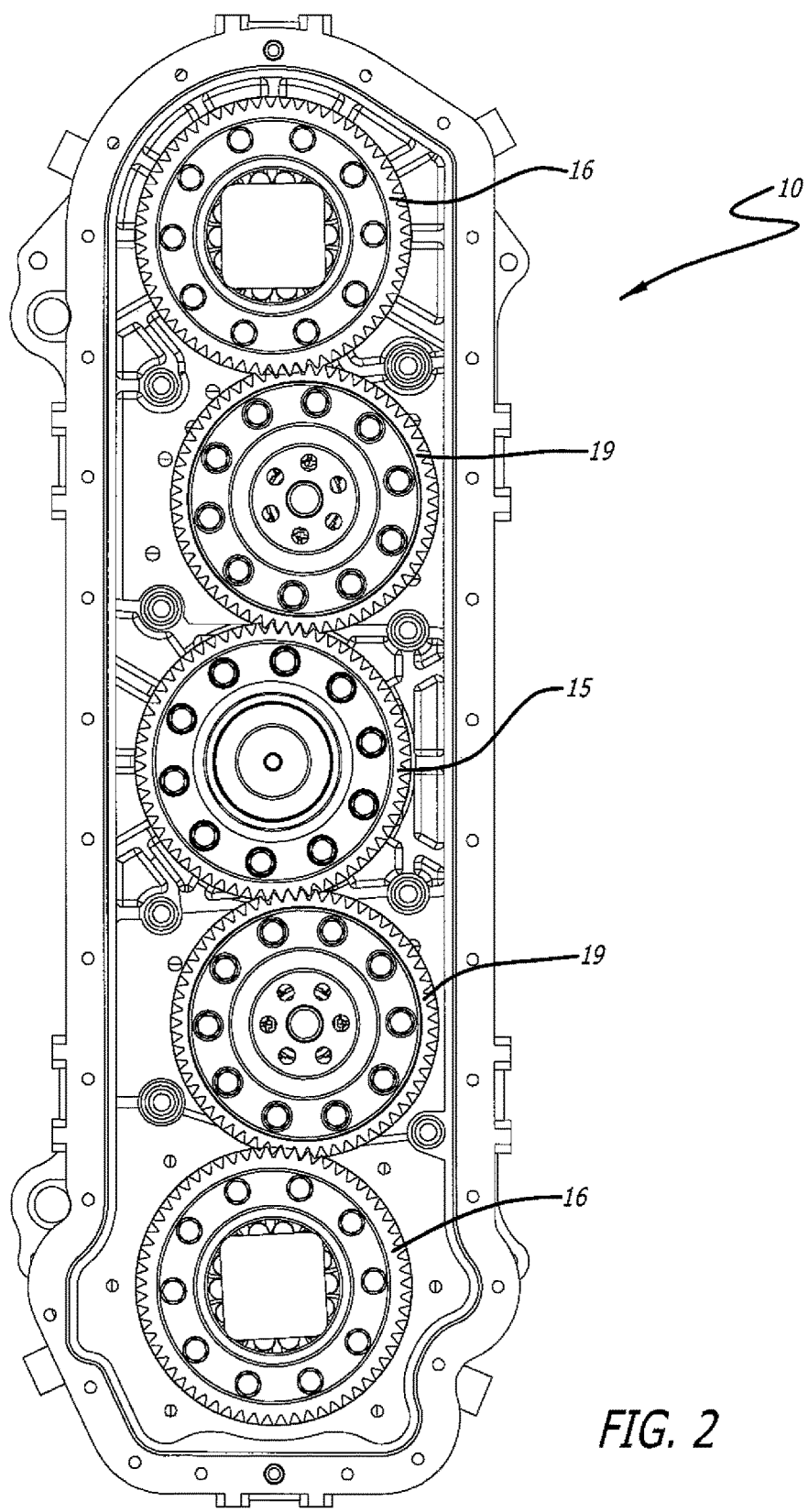
FIG. 2 is an end view of the same gear train with a gear box cover removed.

Constructions and methods of operation directed to the control of backlash in opposed-piston engines are described in detail with reference to the drawings. FIGS. 1 and 2 show a gear train 10 for an opposed-piston engine equipped with two crankshafts 12 and 14. The crankshafts 12 and 14 are disposed in parallel, in a spaced-apart arrangement. The precise opposed-piston configuration by which the crankshafts 12 and 14 are driven for rotation is a matter of design choice; one example is seen in FIG. 1C of commonly-owned U.S. Ser. No. 13/858,943 (Pre-Grant Publication US 2014/0299109) and PCT/US2014/033066 (Published as WO2014/168842). The gear train 10 includes a plurality of gear assemblies, two of which (indicated by reference numeral 16) are fixed to respective ends of the crankshafts 12 and 14 for rotation thereby, and one of which (indicated by reference numeral 15) is fixed to the end of a power take-off shaft 18. In this configuration, two idler gear assemblies 19 are provided; each idler gear assembly is mounted for rotation on a fixed shaft or post. As a result of the configuration of the gear train 10, the crankshafts 12 and 14 are co-rotating, that is to say, they rotate in the same direction. However, this is not meant to so limit the scope of this disclosure. In fact, the gear assembly construction disclosed in this specification can be incorporated into gear trains with fewer, or more, gear assemblies, and with counter-rotating crankshafts. Thus, although these figures show five gears for the gear train it should be understood that the number and types of gears required is dictated only by the particular engine configuration. Also, the output drive shaft can be connected to any one of the gears. In any case, these gear train assemblies often experience backlash that causes vibration, noise and gear tooth wear during torque reversal events or other normal gear operation that occur during each cycle of engine operation.

Figure 3:
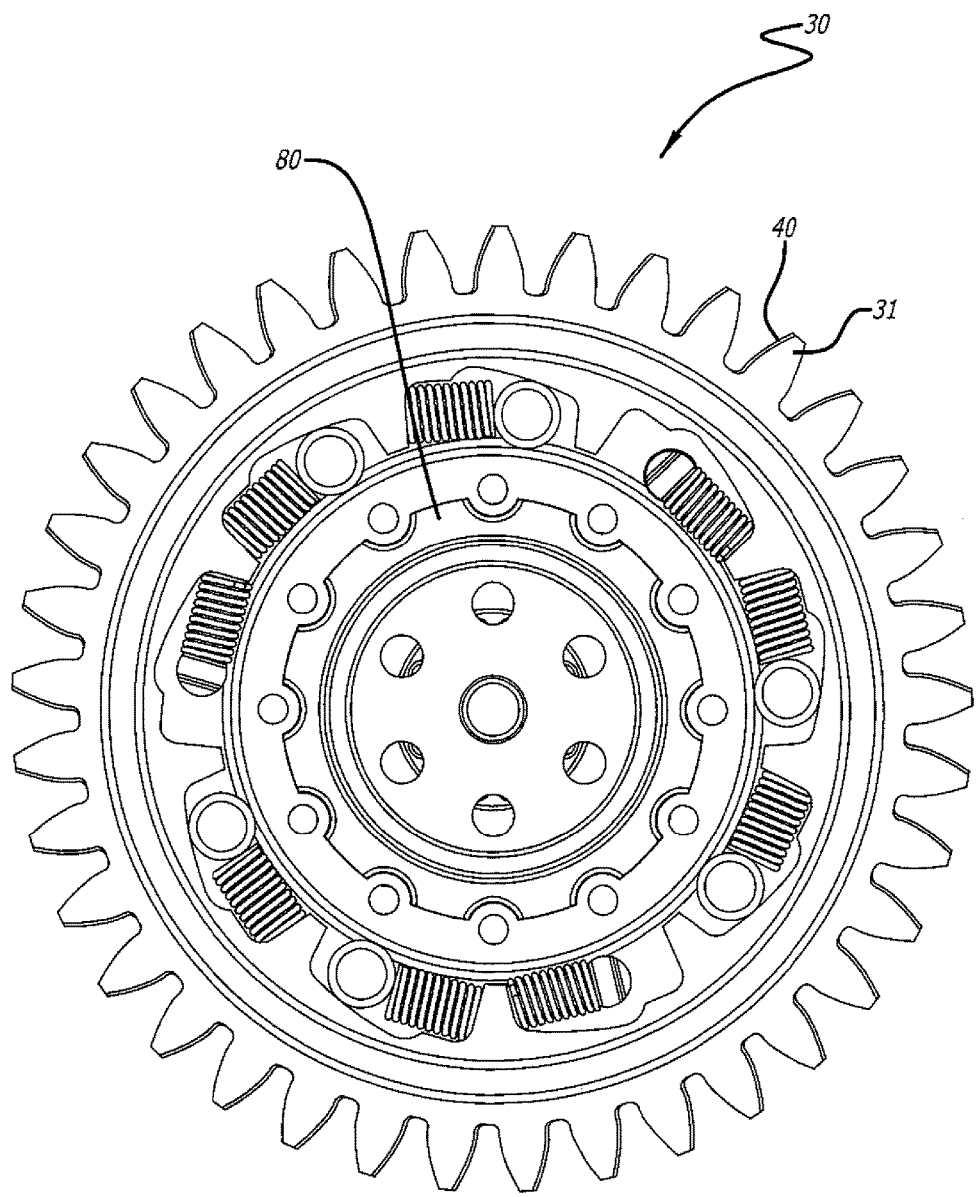
FIG. 3 is front view of a split gear assembly for an opposed-piston gear train according to this disclosure.
Figure 6:
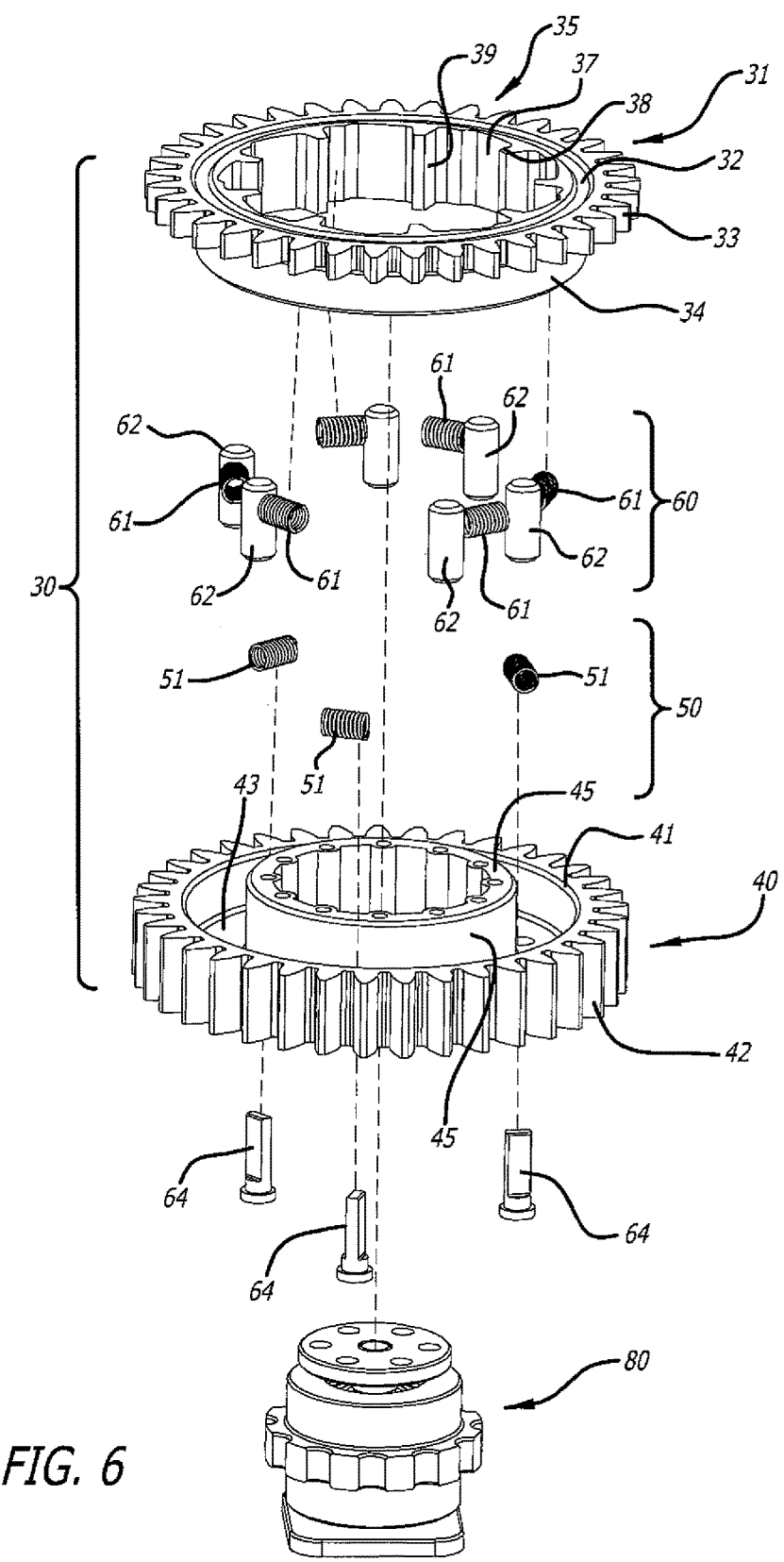
FIG. 6 is an exploded view of the split gear assembly of this disclosure.

FIG. 3 is a front view of a split gear assembly 30 for a gear train coupling two crankshafts of an opposed-piston engine according to this disclosure. At least one of the gear assemblies in the gear train 10 of FIGS. 1 and 2 may include the split gear assembly 30; in some instances, some or all of the gear assemblies 15, 16, and 19 may include the split gear assembly 30. Preferably, at least one of the idler gear assemblies 19 includes the split gear assembly. Referring to FIGS. 3 and 6, the split gear assembly 30 includes a first gear 31 (the "anti-backlash gear"), a second gear 40 (the "power gear"), a spring mechanism 50, and a one-way clutch mechanism 60.

Figure 4:
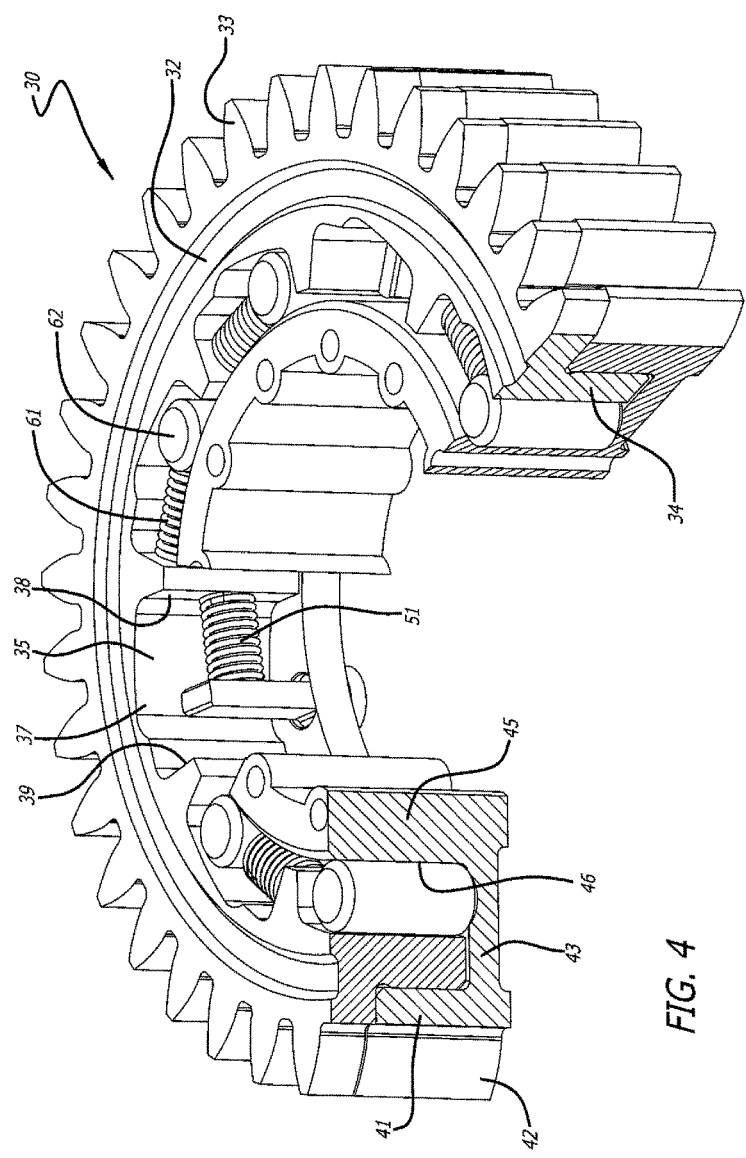
FIG. 4 is an isometric view of a portion of the split gear assembly of this disclosure.

As per FIGS. 3, 4 and 6, the anti-backlash gear 31 has an annular structure 32 with a plurality of gear teeth 33 extending radially outwardly therefrom. The annular structure 32 transitions to an axially-extending annular flange 34. Wedge-shaped indentations 35 are formed in an inner annular wall of the flange 34. Each indentation 35 has a ramped wall portion 37 extending tangentially to the center of the anti-backlash gear between opposing end wall portions 38 and 39. The ramped wall portions 37 are angled in the same direction with respect to the center of the split gear assembly. The power gear 40 has an annular structure 41 with a plurality of gear teeth 42 extending radially outwardly therefrom. The annular structure 41 transitions to a circular floor 43 that extends radially inwardly of the power gear 40 to an axially-extending annular flange 45. The flange 45 has a smooth outer annular wall 46. The peripheries on the gears 31 and 40 where the gear teeth are located have identical diameters; preferably, but not necessarily, the teeth 33 and 42 are identically shaped in the radial direction of the split gear 30. When the gears 31 and 40 are aligned for assembly as per FIGS. 3 and 4, with the teeth 33 and 42 registered, they present and operate as a single gear.

As per FIGS. 4 and 6, the spring mechanism 50 includes a plurality of springs 51. In the exemplary embodiment of the figures, there are three coiled springs 51, although this is not meant to limit either the number or type of springs in the spring assembly. The one-way clutch mechanism 60 includes a plurality of coiled springs 61 and cylindrical rollers 62. Each of the springs 61 is associated with a respective one of the rollers 62 to form a clutch unit. In the exemplary embodiment of the figures, there are six clutch units, although this is not meant to limit the number of clutch units. Further, although the one-way clutch mechanism is illustrated as being constituted of roller/spring units, this is not meant to be limiting; other clutch units may include, for example, sprag devices.

The power gear 40 may be formed from a hardened steel material or other material suitable for handling the load stresses demands of a gear train. The anti-backlash gear 31 may be of a softer material that has been either hardened or coated to ensure uniform wear. The springs 51 and 61 may be helical devices, formed from hardened steel. The rollers 62 may be solid cylindrical devices formed from hardened steel.

As per FIGS. 3, 4, and 6, the anti-backlash gear 31 and the power gear 40, with their teeth registered, are assembled into a close abutting relationship in which the flange 34 is received in space defined by the annular structure 41, the floor 43, and the flange 45. With the gears 31 and 40 thus positioned, a circular array of wedge-shaped spaces is defined between the wedge-shaped indentations 35 of the anti-backlash gear 31 and the outer flange wall 46 of the power gear 40.

Figure 5:
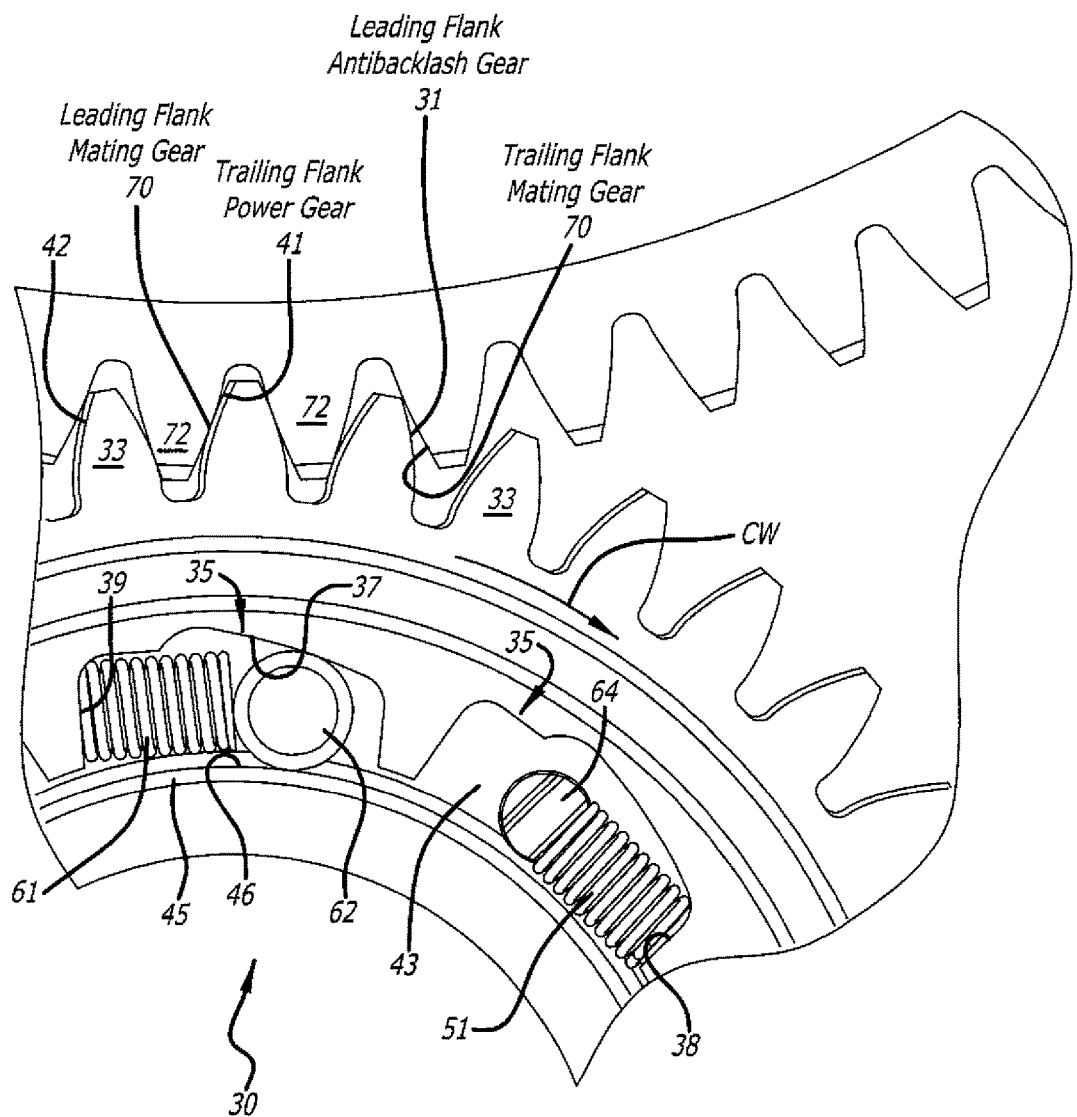
FIG. 5 is a partial elevation view showing a split gear according to this disclosure in meshed engagement with a mating gear.

As per FIGS. 4 and 5, the springs 51 of the spring mechanism are distributed in a circumferential array in the split gear assembly 30, each being received in a respective one of the shaped spaces 35. Each spring 51 is compressed, having a first end fixed relative to the anti-backlash gear by a wall portion 38 of the anti-backlash gear 31 a second end fixed relative to the power gear 40 by a pin 64 fixed to the floor 43 of the power gear 40. The compressed conditions of the springs 51 act between the backlash and power gears 31 and 40 by exerting a bias that causes relative rotation between the gears 31 and 40. In the example shown the direction of relative movement of the anti-backlash gear with respect to the power gear is clockwise (CW); but this is not meant to be limiting since rearrangement of parts can make the bias direction counter-clockwise (CCW).

The clutch units 61, 62 of the one-way clutch mechanism are distributed in a circumferential array in the split gear assembly 30, where they are interspersed with the springs 51 of the spring mechanism. Each clutch unit is received in a respective one of the shaped spaces 35. Each spring 61 is compressed between a wall portion 39 of the anti-backlash gear 31 and a roller 62. The compressed condition of the spring 61 acts between the wall portion 39 of the anti-backlash gear 31 and the roller 62 by forcing the roller 62 into increasingly smaller wedge-shaped space between the angled wall portion 37 of the anti-backlash gear 31 and the smooth outer wall 46 of the power gear flange 45. In the example shown this locks the anti-backlash gear 31 against rotation relative to the power gear 40 in a direction opposite to the direction of relative movement resulting from the bias action of the spring mechanism 50. In the example shown in the figures, the one-way clutch mechanism 60 locks the anti-backlash gear 31 against counter-clockwise (CCW) movement relative to the power gear 40; but this is not meant to be limiting since rearrangement of parts can make the locked direction clockwise (CW).

Referring now to FIGS. 3, 4, and 5, the split gear 30 operates as a single gear with means to control backlash in the meshing interface with a mating gear 70. In the meshing interface, the teeth 42 of the power gear 40 are in normal contact with the teeth 72 of the mating gear 70. The anti-backlash gear 31 is spring loaded by the three weak springs 51, which angularly offsets the anti-backlash gear 31 relative to the power gear 40 in a first direction (CW in the example) so that it moves slightly ahead of the power gear 40. As best seen in FIG. 5, this ensures that the leading flank of the anti-backlash gear 31 is always in contact with the trailing flank of the mating gear 70 whenever the trailing flank of the power gear 41 is in contact with the leading flank of the mating gear 70. That is to say, the leading and trailing edges of the split gear 30 are always in contact with the leading and trailing flanks of the mating gear 70 whenever in driving force contact, (two to three gear teeth at any one time).

Still referring to FIG. 5, a clutch unit 61, 62 is shown located within a wedge-shaped space 35 of the anti-backlash gear 31. The spring 61 keeps the roller 62 lodged in the wedge-shaped space 31. If, during a torque reversal, pressures are exerted on the anti-backlash gear 31 in a CCW direction the roller 62 is forced toward the wall portion 38, thereby locking the anti-backlash gear 31 from CCW movement. The combination of continuous trailing and leading flank contacts of the meshing gear teeth produced by the spring mechanism 50 with the directional locking of the clutch mechanism 60 guarantees anti-backlash control during torque reversals.

It is preferred that the springs 51 of the spring mechanism 50 be no stronger than required to ensure that the anti-backlash gear 31 is always in an advanced state in relation to the power gear 40. However, it is also possible that normal engine vibrations, caused by other than gear backlash conditions, could cause the same effect, which might eliminate the need for the springs 51. In contrast, the springs 61 of the one-way clutch mechanism 60 should have strength sufficient to withstand the high forces encountered during high-power operation. Under these conditions, it will be the case that the strength of the clutch springs 61 exceeds the strength of the biasing springs 51.

It is preferred that in a five-gear engine configuration at least the two idler gears 19 have the split gear configuration with anti-backlash capability as described above. Regardless of the number of gears in the gearbox, one or more idler gears preferably would be split gears with anti-backlash capability as described above. The split gear 30 may be mounted for rotation in a gear train using conventional arrangements. For example, with reference to FIGS. 1, 3, and 6, when used as an idler gear 19, a split gear assembly 30 according to this specification may be assembled as described, received on a hub 80, and rotatably mounted on a stationary post 85 in a gear box 86.

It will be understood that the scope of the invention as described and illustrated herein is not limited to the described embodiments. Those of skill will appreciate that various modifications, additions, known equivalents, and substitutions can be made to the split gear assembly without departing from the scope and spirit of the invention as set forth in the following claims.

The invention claimed is:

1. A split gear assembly, comprising:
   a first gear and a second gear assembled in a close abutting relationship;
   a spring mechanism acting between the first and second gears to rotate the first gear relative to the second gear in a first direction; and
   a one-way clutch mechanism acting between the first and second gears to prevent rotation of the first gear relative to the second gear in a second direction opposite the first direction;
   in which the spring mechanism includes a plurality of compressed first springs disposed in a circular array of respective first spaces between the first gear and the second gear, each compressed first spring having a first end fixed relative to the first gear and a second end fixed relative to the second gear; and
   in which the one-way clutch mechanism includes a plurality of clutch units disposed in a circular array of respective second spaces between the first gear and the second gear, each clutch unit including a spring-biased roller that is pressed into engagement with a wedge-shaped portion of a space in response to force applied to the first gear in the second direction.

2. The split gear assembly of claim 1, in which each spring-biased roller includes a compressed second spring and a cylindrical roller, the compressed second spring having a first end fixed relative to the first gear and a second end contacting the cylindrical roller, and the cylindrical roller is disposed in the wedge-shaped space between a ramped wall portion of the first gear and a flange surface of the second gear.

3. A split gear assembly, comprising:
   a first gear and a second gear assembled in a close abutting relationship;
   a spring mechanism acting between the first and second gears to rotate the first gear relative to the second gear in a first direction;
   a one-way clutch mechanism acting between the first and second gears to prevent rotation of the first gear relative to the second gear in a second direction opposite the first direction; and
   a circumferential array of shaped spaces between the first gear and the second gear, in which the spring mechanism includes a plurality of compressed springs disposed in a circular sequence of respective first shaped spaces, and the clutch mechanism includes a plurality of clutch units disposed in a circular sequence of second shaped spaces that are interspersed with the first shaped spaces;

in which each clutch unit includes a spring-biased roller that is pressed into engagement with a wedge-shaped portion of a second space in response to force applied to the first gear in the second direction.

4. A gear train assembly coupling two crankshafts of an opposed-piston engine that are disposed in a parallel, spaced-apart relationship, comprising:
 a driving gear coupled to a first crankshaft; and,
 a split gear assembly engaged with the driving gear to transfer rotation from the driving gear to the split gear assembly, in which the split gear assembly includes:
 a first gear and a second gear assembled in a close abutting relationship;
 a spring mechanism that acts to rotate the first gear relative to the second gear in a first direction; and
 a one-way clutch mechanism that prevents rotation of the first gear relative to the second gear in a second direction opposite the first direction,
 in which the spring mechanism includes a plurality of compressed first springs disposed in a circular array of respective first spaces between the first gear and the second gear, each compressed first spring having a first end fixed relative to the first gear and a second end fixed relative to the second gear; and,
 in which the one-way clutch mechanism includes a plurality of clutch units disposed in a circular array of respective second spaces between the first gear and the second gear, each clutch unit including a spring-biased roller that is pressed into engagement with a wedge-shaped portion of a space in response to force applied to the first gear in the second direction.

5. The gear train assembly of claim 4, in which each spring-biased roller includes a compressed second spring and a cylindrical roller, the compressed second spring having a first end fixed relative to the first gear and a second end contacting the cylindrical roller, and the cylindrical roller is disposed in the wedge-shaped space between a ramped wall portion of the first gear and a flange surface of the second gear.

6. A gear train assembly coupling two crankshafts of an opposed-piston engine that are disposed in a parallel, spaced-apart relationship, comprising:
 a driving gear coupled to a first crankshaft; and
 a split gear assembly engaged with the driving gear to transfer rotation from the driving gear to the split gear assembly, in which the split gear assembly includes:
 a first gear and a second gear assembled in a close abutting relationship;
 a spring mechanism that acts to rotate the first gear relative to the second gear in a first direction;

a one-way clutch mechanism that prevents rotation of the first gear relative to the second gear in a second direction opposite the first direction; and
circumferential array of shaped spaces between the first gear and the second gear, in which the spring mechanism includes a plurality of compressed springs disposed in a circular sequence of respective first shaped spaces, and the clutch mechanism includes a plurality of clutch units disposed in a circular sequence of second shaped spaces that are interspersed with the first shaped spaces,
in which each clutch unit includes a spring-biased roller that is pressed into engagement with a wedge-shaped portion of a space in response to force applied to the first gear in the second direction.

7. The gear train assembly of claim 6, in which each spring-biased roller is disposed in the wedge-shaped space between a ramped wall portion of the first gear and a flange surface of the second gear.

8. A gear train assembly coupling two crankshafts of an opposed-piston engine that are disposed in a parallel, spaced-apart relationship, comprising:
 a driving gear coupled to a first crankshaft; and,
 a split gear assembly engaged with the driving gear to transfer rotation from the driving gear to the split gear assembly, in which the split gear assembly includes:
 a first gear and a second gear assembled in a close abutting relationship;
 a spring mechanism that acts to rotate the first gear relative to the second gear in a first direction; and
 a one-way clutch mechanism that prevents rotation of the first gear relative to the second gear in a second direction opposite the first direction;
 in which the spring mechanism includes a plurality of compressed first springs disposed in a circular array of respective first spaces between the first gear and the second gear, each compressed first spring having a first end fixed relative to the first gear and a second end fixed relative to the second gear; and
 in which the driving gear is a first driving gear and the split gear assembly is a first idler gear, further including a second driving gear coupled to a second crankshaft, and a second idler gear engaged with the second driving gear to transfer rotation from the driving gear to the second idler gear.

9. The gear train assembly of claim 8, wherein the second idler gear includes:
 a third gear and a fourth gear assembled in a close abutting relationship;
 a spring mechanism that acts to rotate the third gear relative to the fourth gear in a third direction; and
 a one-way clutch mechanism that prevents rotation of the third gear relative to the fourth gear in a fourth direction opposite the third direction.

* * * * *